US011381505B2

(12) United States Patent
Cherukuru

(10) Patent No.: US 11,381,505 B2
(45) Date of Patent: Jul. 5, 2022

(54) ACKNOWLEDGMENT STORM DETECTION

(71) Applicant: HEWLETT PACKARD ENTERPRISE DEVELOPMENT LP, Houston, TX (US)

(72) Inventor: Siva Ramaprasad Cherukuru, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 35 days.

(21) Appl. No.: 16/712,955

(22) Filed: Dec. 12, 2019

(65) Prior Publication Data
US 2020/0204496 A1 Jun. 25, 2020

(30) Foreign Application Priority Data
Dec. 14, 2018 (IN) .............................. 201841047500

(51) Int. Cl.
H04L 47/12 (2022.01)
H04L 1/18 (2006.01)
H04L 69/16 (2022.01)
H04L 43/16 (2022.01)

(52) U.S. Cl.
CPC ............ H04L 47/12 (2013.01); H04L 1/18 (2013.01); H04L 43/16 (2013.01); H04L 69/16 (2013.01)

(58) Field of Classification Search
CPC . H04L 47/12; H04L 1/18; H04L 69/16; H04L 43/16; H04L 1/1642; H04L 69/28; H04L 47/28; H04L 47/34; H04L 47/193; H04L 45/28

USPC ......................................................... 370/229
See application file for complete search history.

(56) References Cited

U.S. PATENT DOCUMENTS

| 2007/0168823 A1* | 7/2007 | Carter .................... H04L 41/00 714/748 |
| 2009/0228971 A1* | 9/2009 | Samuels ................. H04L 1/187 726/12 |
| 2010/0029275 A1 | 2/2010 | Bosch et al. |
| 2014/0325588 A1* | 10/2014 | Jalan ................... H04L 63/1466 726/1 |
| 2015/0215436 A1* | 7/2015 | Kancherla ........... H04L 63/1458 709/219 |
| 2015/0281288 A1* | 10/2015 | Levinson .............. H04L 47/125 709/219 |
| 2015/0288612 A1 | 10/2015 | Smith et al. |
| 2018/0063024 A1* | 3/2018 | Pfister ................. H04L 12/1868 |

(Continued)

OTHER PUBLICATIONS

Cisco Systems, "Release Notes for Cisco IOS Release 11.1," Jan. 11, 1999, pp. 1-184, USA.

(Continued)

Primary Examiner — Kwang B Yao
Assistant Examiner — Syed M Bokhari
(74) Attorney, Agent, or Firm — Trop, Pruner & Hu, P.C.

(57) ABSTRACT

In some examples, a device initiates an acknowledgement storm detection process in response to failover of a network connection from a first input/output (I/O) module to a second I/O module. The acknowledgement storm detection process includes determining whether desynchronization between a received packet and a sent packet satisfies a criterion, and in response to determining that the desynchronization between the received packet and the sent packet satisfies the criterion, initiate an action to recover from the desynchronization.

19 Claims, 5 Drawing Sheets

(56) References Cited

U.S. PATENT DOCUMENTS

2018/0109456 A1*  4/2018  Chen .................. H04L 67/1027
2018/0167263 A1   6/2018  Patel et al.
2018/0248850 A1*  8/2018  Tee ..................... H04L 69/16
2019/0058663 A1*  2/2019  Song ................... H04L 47/26

OTHER PUBLICATIONS

S. Oehme et al., "IBM Scale Out File Services: Reinventing Network-attached Storage," IBM J. Res. & Dev., Jul. 4, 2008, pp. 1-10, vol. 52, No. 4/5, IBM.
Cao et al., "Off-Path TCP Exploits of the Challenge ACK Global Rate Limit," IEEE/ACM Transactions on Networking, vol. 26, No. 2, Apr. 2018, pp. 765-778.
Criu, "Checkpoint/Restore In Userspace", available online at <https://criu.org/Main_Page>, Sep. 11, 2019, pp. 1-4.
HPE, "HPE NonStop Operating System", Technical White Paper, Rev. 3, Apr. 2018, 11 pages.
Ramaiah et al., "Improving TCP's Robustness to Blind In-Window Attacks", Internet Engineering Task Force (IETF), Aug. 2010, pp. 1-19.
Trend Micro Inc., "Deep Security as a Service", Dec. 7, 2017, 949 pages.

\* cited by examiner

ACKNOWLEDGMENT STORM DETECTION

BACKGROUND

To perform data communications, electronic devices can establish network connections over a network. Examples of network connections include Transmission Control Protocol (TCP) connections. A TCP connection can be in any of various different states, and can use sequence and acknowledgment numbers to allow for ordered delivery of data packets between the electronic devices over the TCP connection.

BRIEF DESCRIPTION OF THE DRAWINGS

Some implementations of the present disclosure are described with respect to the following figures.

Figure 1:
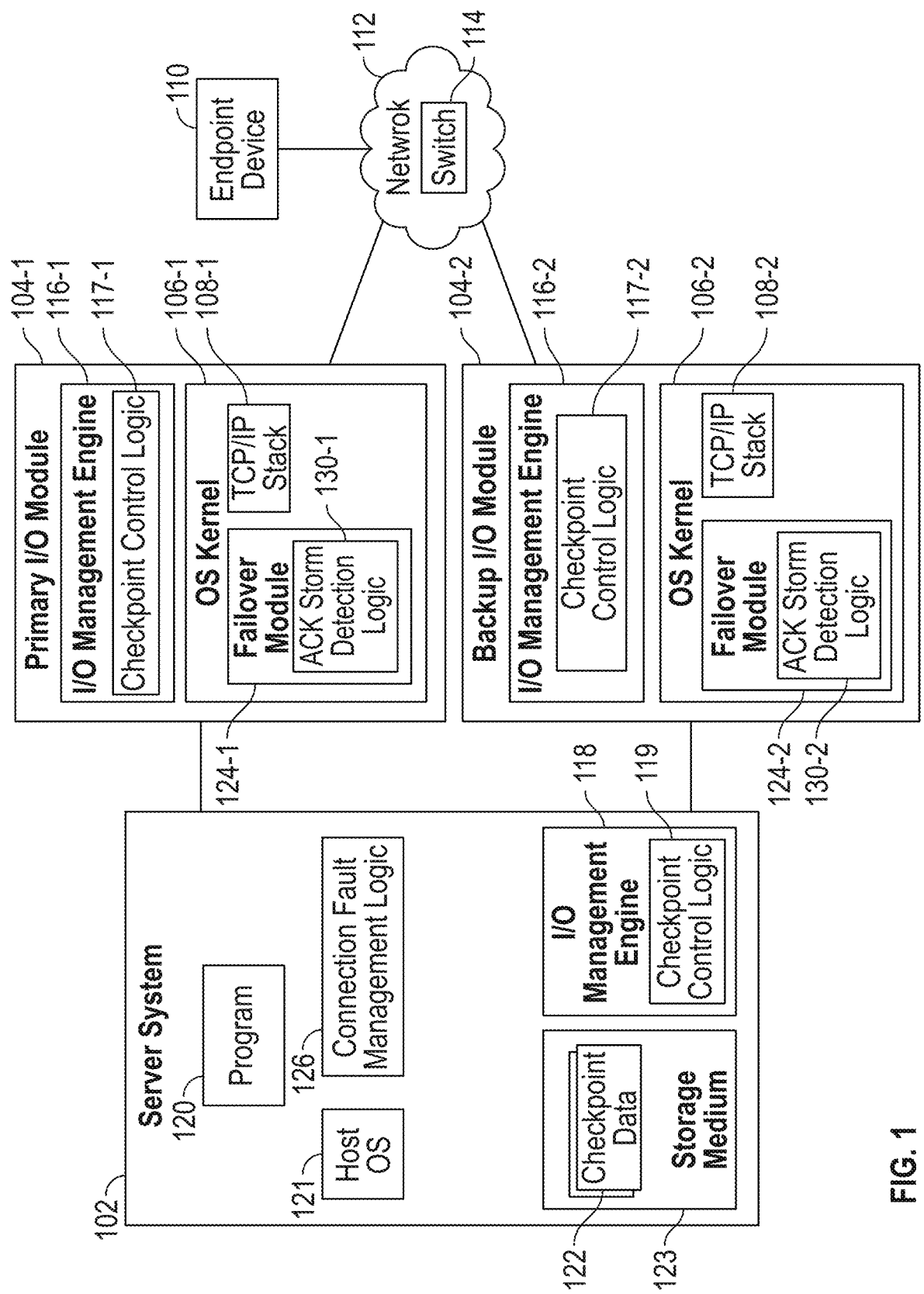
FIG. 1 is a block diagram of an arrangement that includes a server system and input/output (I/O) modules according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An electronic device can establish a network connection through an input/output (I/O) module. As used here, an "I/O module" can refer to any device or component that includes communication elements to allow for the transmission and reception of data over a network. The communication elements can include a transceiver and a network protocol stack including protocol layers that perform communications according to respective communication protocols. For example, the protocol layers can include a transport layer and a network layer. An example of the transport layer includes a Transmission Control Protocol (TCP) layer. A TCP layer is able to establish a TCP connection over which data packets are communicated between endpoints. TCP provides for reliable, ordered, and error-checked delivery of data between TCP layers associated with the endpoints. TCP is described in Request for Comments (RFC) 793, entitled "Transmission Control Protocol," dated September 1981.

Although examples described in this disclosure refer to TCP connections, it is noted that techniques or mechanisms according to some implementations of the present disclosure can be applied to other types of connections over a network that are according to other transport protocols.

An example of a network layer is an Internet Protocol (IP) layer, which communicates data packets between endpoints (e.g., virtual processes) including IP addresses (such data packets can be referred to as "IP packets" or "IP data packets"). In other examples, other types of network layers can be employed. In some examples, TCP messages can be carried in IP packets.

For redundancy to protect against communication failure, an electronic device can be coupled to multiple I/O modules, where one of the I/O modules can be a backup I/O module for another I/O module. In case of fault of a primary I/O module, the electronic device can fail over to the backup I/O module to continue communications over the network. A fault of an I/O module can be due to a hardware failure, a crash or other error of machine-readable instructions in the I/O module, and so forth.

The multiple I/O modules coupled to the electronic device can be external of the electronic device, or can be included as part of the electronic device. In some examples, each I/O module includes an operating system (OS) kernel that has a network stack, such as a TCP/IP stack. A kernel of an OS can refer to any portion of the OS that is designated to perform selected tasks of the OS, such as managing hardware components, managing communications, managing processes, and so forth. The OS kernel can include a Linux kernel, for example. In other examples, other types of OS kernels can be used.

As an example, the electronic device can include a server computer, and the I/O modules can be devices used to offload certain tasks from the server computer. Such offloaded tasks include tasks of the network stack, data storage tasks, and so forth. The I/O modules themselves can be server computers in some examples. Alternatively, the I/O modules can be in the form of adapters or peripheral devices that can be coupled to the server computer or other electronic device.

The I/O modules can be configured to perform live migration of a TCP connection from a primary I/O module to a backup I/O module. "Live" migration can refer to a migration of the TCP connection while processes continue to execute in the electronic device coupled to the I/O modules. The migrated TCP connection at the backup I/O module is to maintain the same state and to use the same sequence and acknowledgment numbers of the TCP connection prior to the migration. Also, send and receive buffers containing unacknowledged data are also maintained for the migrated TCP connection.

To perform live migration, information regarding the TCP connection can be saved as the state of the TCP connection changes and data packets are exchanged in the TCP connection. Saving such information can be referred to as checkpointing the data. The checkpointed data can be saved in the electronic device or in another storage location. In case of fault of the primary I/O module, the checkpointed data can be used to recreate the TCP connection at the backup I/O module with the same state, same sequence/acknowledgment numbers, and same content of data buffers as the TCP connection at the primary I/O module.

Although the goal of live migration is to migrate a TCP connection from the primary I/O module to the backup I/O module such that the migrated TCP connection has the same state, same sequence/acknowledgment numbers, same content of data buffers, and other properties, in some cases, corruption in the checkpointed data can cause an issue in the TCP connection migration. For example, the corrupted checkpointed data can cause electronic devices in the TCP connection to use inconsistent sequence and acknowledgment numbers. Such a condition is referred to as desynchronization between sequence/acknowledgment numbers in sent and received packets communicated between the electronic devices. Desynchronization can lead to an acknowledgment storm (also referred to as an "acknowledgment war"), where a sender electronic device repeatedly sends data packets in response to mismatches between sequence and acknowledgement numbers, and the recipient electronic device continues to send acknowledgments of the repeatedly sent data packets. This exchange can cause an acknowledgment storm including a large number of acknowledgment messages, which can lead to increased network congestion and hung TCP connections.

In accordance with some implementations of the present disclosure, in response to failover of a network connection (e.g., a TCP connection) from a primary I/O module to a backup I/O module, an acknowledgement storm detection process (or equivalently, an acknowledgment war detection process) is initiated. The acknowledgement storm detection process includes determining whether desynchronization between a received packet and a sent packet satisfies a criterion (e.g., if a number of desynchronized received packets from a recipient electronic device exceeds a count threshold within a specified elapsed timeout duration), and in response to determining that the desynchronization between the received packet and the sent packet satisfies the criterion, initiating an action to recover from the desynchronization. In other examples, desynchronization may further be indicated based on unexpected values of other properties of a network connection, where such other properties can include TCP window sizes, timestamps, selective acknowledgment options, and so forth. Such other properties are discussed further below.

FIG. 1 depicts an example arrangement that includes a server system 102 that is coupled to I/O modules 104-1 and 104-2. In some examples, the I/O module 104-1 is a primary I/O module for the server system 102, while the I/O module 104-2 is a backup I/O module to be used in case of a fault of the primary I/O module 104-1. A fault of an I/O module can be caused by a failure of a hardware component of the I/O module, a failure or error of machine-readable instructions executed in the I/O module, or a failure or error in communication over a communication link. Note that at different times, the I/O module 104-1 can become a backup I/O module, while the I/O module 104-2 is a primary I/O module.

The server system 102 can be implemented using a single computer or multiple computers. Although FIG. 1 shows the I/O modules 104-1 and 104-2 as being separate from the server system 102, in other examples, it is possible for the I/O modules 104-1 and 104-2 to be part of the server system 102.

In the example of FIG. 1, the primary and secondary I/O modules 104-1 and 104-2 can include similar components. The following describes components of the primary I/O module 104-1. The same or similar description applies to the components of the secondary I/O module 104-2. Although reference is made to a specific arrangement of components, it is noted that alternative or additional components for the I/O modules can be employed in other examples.

The primary I/O module 104-1 includes an OS kernel 106-1. The OS kernel 106-1 includes a TCP/IP stack 108-1. The TCP/IP stack 108-1 allows for the server system 102 to communicate data over a TCP connection established between the server system 102 and another endpoint device 110 over a network 112. The network 112 can include a local area network (LAN), a wide area network (WAN), a public network such as the Internet, and so forth.

An I/O module offloads certain communication functions from the server system 102 to the I/O module. An example of such an offloaded function is a network stack (e.g., the TCP/IP stack) that includes protocol layers (e.g., the TCP layer and the IP layer) that perform communications according to respective communication protocols. Another example of an offloaded function is failure management of a network connection (e.g., a TCP connection), where the failure management includes failing over from a faulty I/O module to a backup I/O module.

Since the TCP/IP stack 108-1 is included in the OS kernel 106-1 of the primary I/O module 104-1, a TCP/IP stack would not have to be included in a host OS 121 of the server system 102. An OS refers to machine-readable instructions that manage hardware components, manage communications, manage processes, and so forth.

The network 112 can include a switch 114 (or multiple switches). A switch is used to transfer data from a sender to a recipient. A switch can refer to a layer 2 switch (e.g., an Ethernet switch) or a layer 3 router (e.g., an Internet Protocol (IP) router).

The primary I/O module 104-1 further includes an I/O management engine 116-1, which can cooperate with a corresponding I/O management engine 118 of the server system 102 for establishing network connectivity between the server system 102 and the network 112 through the TCP/IP stack 108-1.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The I/O management engines 116-1 and 118 can also cooperate to perform other tasks. For example, the I/O management engine 116-1 can include a checkpoint control logic 117-1 that cooperates with a checkpoint control logic 119 of the I/O management engine 118 to save checkpointed data 122 in a storage medium 123 of the server system 102. The storage medium 123 can be implemented using a memory device (or multiple memory devices) and/or a persistent storage device (or multiple persistent storage devices). There can be multiple instances of checkpointed data 122 for respective different TCP connections established by the server system 102 over the network 112.

The checkpoint control logic 117-1 or 119 can include a portion of the hardware processing circuit of the respective I/O management engine 116-1 or 118, or alternatively, can include machine-readable instructions executable by the respective I/O management engine 116-1 or 118.

At a later time, the checkpointed data 122 can be retrieved from the storage medium 123 for the purpose of failing over from the primary I/O module 104-1 to the backup I/O module 104-2. In other examples, the checkpointed data 122 can be stored at another storage location outside the server system 102.

As examples, the checkpoint control logic 117-1 can send, to the checkpoint control logic 119, indicators of a state of a TCP connection over the network 112 established by the server system 102 (or more specifically, by machine-readable instructions (e.g., a program 120, the host OS 121, etc.) executed in the server system 102. An "indicator" can refer to a message, an information element, and so forth. A program can refer to an application program, or other type of machine-readable instructions.

The checkpoint control logic 117-1 can also send to the checkpoint control logic 119 indicators of sequence and acknowledgement numbers used in the TCP connection, as well as data in send buffers that have not yet been acknowledged by a recipient in the TCP connection, and data in receive buffers for which acknowledgments have not yet been sent to a sender of the data. In response to the indicators received from the checkpoint control logic 117-1, the checkpoint control logic 119 in the I/O management engine 118 saves checkpointed data 122 for the TCP connection into the storage medium 123.

The checkpoint control logic 117-1 can further send to the checkpoint control logic 119 indicators containing other properties (discussed further below) of the TCP connection.

As further shown in FIG. 1, the OS kernel 106-1 includes a failover module 124-1 to manage a failover of a TCP connection from another I/O module to the I/O module 104-1 in response to a fault of the other I/O module (in such an example, the I/O module 104-1 is a backup I/O module for the other I/O module). The failover module 124-1 can be implemented using machine-readable instructions that are part of the OS kernel 106-1, in some examples. Alternatively, the failover module 124-1 can be implemented using a hardware processing circuit.

The failover module 124-1 is able to monitor and control changes happening during the lifecycle of a TCP connection established using the TCP/IP stack 108-1. The failover module 124-1 can provide, to the checkpoint control logic 117-1 information pertaining to the TCP connection state, sequence numbers, window sizes, timestamps, acknowledgement numbers (including selective acknowledgement numbers), data in send and receive buffers for a TCP connection, and so forth, of the TCP/IP stack 108-1.

A TCP connection can transition through various different states during the lifetime of the TCP connection. Examples of TCP states include LISTEN (a state waiting for a connection request), SYN-SENT (a state waiting for an acknowledgement from a remote endpoint after having sent a connection request), SYN-RECEIVED (a state where an endpoint has received a connection request and sent an acknowledgement), ESTABLISHED (a state representing a fully established connection), FIN-WAIT-1 (a state waiting for an acknowledgement of a connection termination request from a remote endpoint), FIN-WAIT-2 (a state waiting for a connection termination request from a remote endpoint after the local endpoint has sent a connection termination request), CLOSE-WAIT (a state where the local endpoint has received a close request from a remote endpoint and the TCP connection is now waiting for a connection termination request from a local program), CLOSING (a state waiting for a connection termination request acknowledgement from the remote endpoint), LAST-ACK state (a state waiting for an acknowledgment of a connection termination request previously sent to the remote endpoint), and so forth.

In a TCP connection, a SYN packet is sent by a first endpoint to a remote endpoint to establish a TCP connection. The SYN packet contains a starting sequence number, which can be a random number. With each subsequent packet sent by the local endpoint to the remote endpoint over the TCP connection, two sequence numbers are included: a first sequence number to indicate where in a data stream the current packet is, and an ACK sequence number (also referred to as an acknowledgement number) which signifies the number of bytes received by the local endpoint from the remote endpoint (more specifically, an acknowledgement number is the sequence number of the next byte a recipient expects to receive). Both numbers are offset by the starting sequence number in the SYN packet.

A packet received by the local endpoint from the remote endpoint also includes two sequence numbers: a sequence number indicating a number of bytes that have been transmitted by the remote endpoint to the local endpoint, and an acknowledgement number indicating the number of bytes received by the remote endpoint from the local endpoint. The sequence numbers and acknowledgement numbers are incremented as bytes are sent and received, respectively. Using such sequence and acknowledgement numbers, the local endpoint and the remote endpoint can determine whether any packets have been lost.

The window size refers to the maximum number of bytes that can be sent by a sender but unacknowledged by a recipient. For example, if an acknowledgement number from a recipient is N, and the window size is W, then the sender is allowed to send N+W bytes without receiving an acknowledgement of the sent bytes from the recipient. If the number of unacknowledged bytes exceeds the window size, then the sender can no longer transmit additional data.

TCP timestamps, as defined by RFC 7323, entitled "TCP Extensions for High Performance," dated September 2014, represent times at which packets were sent, to help endpoints of a TCP connection determine in which order packets were sent.

When a sender does not receive an acknowledgement of bytes that have been transmitted by the sender, a retransmission timeout can occur at the sender, which will cause the sender to retransmit the bytes for which the sender has not received an acknowledgement. In some examples, selective acknowledgement (SACK) can be used to more efficiently perform retransmission of data. SACK can define a range of bytes that were received. For example, the sender may have sent bytes 1-8, but the recipient may have just received bytes 1, 2, 7, and 8. Thus, bytes 3-6 were not received by the recipient. If both the sender and the recipient support SACK, the recipient can inform the sender of the bytes that were not received, i.e., bytes 3-6—a process referred to as selective acknowledgment.

A sender also includes a send buffer that stores packets that have been transmitted by the sender but not yet acknowledged by the recipient. In addition, a recipient can include a receive buffer containing packets received from a sender but for which the recipient has not yet sent acknowledgments.

The foregoing example information can be provided by the failover module 124-1 to the I/O management engine 116-1. The checkpoint control logic 117-1 can then send the information to the checkpoint control logic 119 of the I/O management engine 118 of the server system 102 to save the information as the corresponding checkpointed data 122.

In some examples, the I/O management engine 116-1 of the primary I/O module 104-1 operates in a user space that is separate from an OS space of the OS kernel 106-1. The failover module 124-1 can be part of the kernel space, and the failover module 124-1 can be an interface to allow the I/O management engine 116-1 in the user space to obtain TCP-related information from the TCP/IP stack 108-1.

The backup I/O module 104-2 includes similar components as the primary I/O module 104-1, including the following: an I/O management engine 116-2 that includes a checkpoint control logic 117-2 and, an OS kernel 106-2 that includes a TCP/IP stack 108-2 and a failover module 124-2.

In addition to saving TCP-related information received from the primary I/O module 104-1 in the checkpointed data 122, the checkpoint control logic 119 can also store socket related information in the checkpointed data 122. A socket can refer to an inter-process communication channel, such as a channel between processes in different endpoints. To communicate over the network 112, machine-readable instructions, such as the program 120 or the host OS 121, can create a socket at the server system 102. The socket can be created by calling a socket open routine, which can be part of a library of routines. Other routines in the library routines can include a socket close routine to destroy a socket. The library of routines can also include other routines, such as a socket send routine invoked by a socket send call used for sending data across an established connection, a socket receive routine invoked by a socket receive call used to receive data across a connection, and so forth. The various routines of the library routines can be called by issuing application programming interface (API) calls. The checkpointed data 122 can also store the various socket calls that have been made so that the socket calls can be replayed for the purpose of continuing a TCP connection at a backup I/O module with a consistent state.

The server system 102 also includes a connection fault management logic 126, which can detect a fault in a TCP connection established by the server system 102 over the network 112. The connection fault management logic 126 can be implemented as machine-readable instructions, which can be part of the program 120, part of the host OS 121, or can be separate from the program 120 and host OS 121.

The connection fault management logic 126 can detect a fault in the TCP connection. For example, if the connection fault management logic 126 does not receive data from the remote endpoint, a timeout can occur after passage of a specified time duration—this indicates that a problem has occurred for the TCP connection. In response to detecting the fault in the TCP connection, the connection fault management logic 126 can send a failover request to the backup I/O module 104-2. In further examples, the connection fault management logic 126 can also trigger failover (by sending a failover request) between I/O modules in response to detecting any fault or failure in a hardware or software component in one of the I/O modules.

In response to the failover request from the connection fault management logic 126, the failover module 124-2 in the backup I/O module 104-2 can retrieve the corresponding checkpointed data 122 from the storage medium 123. The checkpointed data 122 can be used to replay and overlay the TCP connection on the backup I/O module 104-2.

As noted above, the retrieved checkpointed data 122 can record the socket API calls that were executed on the primary I/O module 104-1 socket. Replaying can be done by creating the socket and keeping the socket in a TCP_REPAIR mode, by making use of a Checkpoint Restore in User Space (CRIU) kernel infrastructure. The CRIU kernel infrastructure is a tool that is part of the Linux OS, and is used to freeze a running program, checkpoint the program to a storage medium, and use the checkpointed data to run the program from the point the program was frozen.

Keeping the socket in the TCP_REPAIR mode to repair a socket allows a TCP connection to be restored to a prior state, rather than to a new initial state. Replaying the socket refers to replaying the socket API calls (included in the retrieved checkpointed data 122) for the socket that were made at the primary I/O module 104-1.

Also, the failover module 124-2 can overlay the socket, in which the failover module 124-2 repairs the TCP connection. For example, send and receive buffers of the TCP connection are repopulated in the TCP/IP stack 108-2 of the OS kernel 106-2 in the backup I/O module 104-2. Also, corresponding sequence and acknowledgment numbers and other properties of the TCP connection failed over from the primary I/O module 104-1 are updated. After the replay and overlay, the socket can be removed from the TCP_REPAIR mode, and the socket is ready to continue communications.

If there is any corruption or inconsistency in the checkpointed data 122, such as errors in sequence and acknowledgement numbers for the TCP connections saved in the checkpointed data 122, then an acknowledgement storm can occur. For example, the following sequence numbers of the recreated socket for the TCP connection failed over from the primary I/O module 104-1 to the backup I/O module 104-2 can be corrupted or incorrect: SND.UNA, SND.NXT, RCV.NXT.

SND.UNA is the sequence number of earliest byte of data sent by the local endpoint to the remote endpoint, but not yet acknowledged by the remote endpoint. SND.NXT is the sequence number of the next byte of data to be sent by the local endpoint to the remote endpoint. RCV.NXT is the sequence number of the next byte of data that is expected by the local endpoint from the remote endpoint.

To detect an acknowledgement storm, each failover module 124-1 or 124-2 includes a respective ACK storm detection logic 130-1 or 130-2. For a failover from the primary I/O module 104-1 to the backup I/O module 104-2, the ACK storm detection logic 130-2 performs the acknowledgement storm detection process. It is also possible that a failover can occur to the primary I/O module 104, such as from the backup I/O module 104-2 or from another I/O module, in which case the ACK storm detection logic 130-1 would perform the acknowledgement storm detection process.

Figure 2:
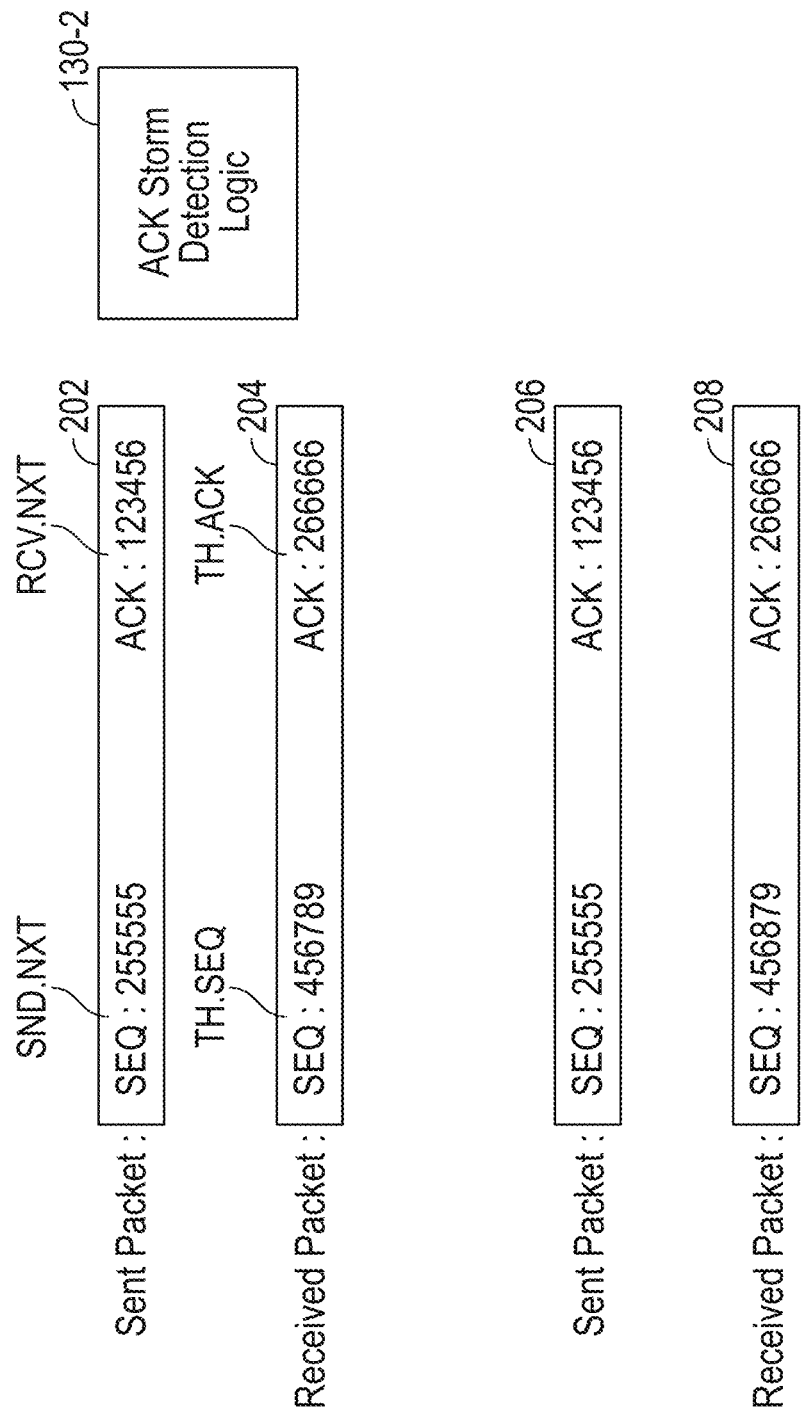
FIG. 2 illustrates an example of detection of an acknowledgment storm by an acknowledgment storm detection logic according to some examples.

FIG. 2 illustrates an example of an acknowledgement storm that can be detected by the ACK storm detection logic 130-2. In the example of FIG. 2, a sent packet 202 is a packet that is sent by the server system 102 to a remote endpoint, such as the endpoint device 110 of FIG. 1. The sent packet 202 includes a sequence number 255555 (which is set equal to SND.NXT for the TCP connection failed over to the backup I/O module 104-2) and an acknowledgement number 123456 (set equal to RCV.NXT of the failed over TCP connection). Note that the sent packet 202 includes other fields not shown in FIG. 2. The sequence number and the acknowledgement number are part of the TCP header in the sent packet 202. The sent packet 202 can also include a payload that contains data carried by the sent packet 202.

In response to the sent packet 202, the server system 102 receives a packet 204 from the endpoint device 110. In the received packet 204, the TCP header includes a sequence number 456789 (which is represented as TH.SEQ) and an acknowledgment number 266666 (which is represented as TH.ACK).

Note that the acknowledgement number in the sent packet 202 represents the sequence number of the next data byte that is expected by the server system 102 from the endpoint device 110 (this is the RCV.NXT value noted above). If the sequence number (TH.SEQ) in the received packet 204 does not match the acknowledgement number (RCV.NXT) in the sent packet 202, then the server system 102 will retransmit the sent packet (as 206 in FIG. 2). In response to the retransmitted sent packet 206, the endpoint device 110 again sends a packet 208, which is a copy of the received packet 204. This process of repeating the sent packet and the receive packet continues, which is a condition referred to as an acknowledgement storm since the packet exchange can continue indefinitely.

The foregoing is an example of desynchronization between the TH.SEQ sequence number in a received packet and the RCV.NXT acknowledgment number of a sent packet.

FIG. 2 also shows a desynchronization between the SND.NXT sequence number of the sent packet 202 and the TH.ACK acknowledgment number of the received packet 204. SND.NXT is the sequence number of the next byte of data to be sent by the server system 102 to the endpoint device 110. The TH.ACK acknowledgement number in the received packet has acknowledged a byte that has not yet been sent by the server system 102, which is another example of desynchronization in the sequence numbers included in the sent and received packets.

In accordance with some implementations of the present disclosure, the ACK storm detection logic 130-2 can detect a condition that is indicative of an acknowledgement storm. Effectively, the ACK storm detection logic 130-2 can track a count of a number of desynchronized received packets from a recipient electronic device. If the count of the number desynchronized received packets from the recipient electronic device exceeds a count threshold within a specified elapsed timeout duration, then an acknowledgment storm is indicated.

Figure 3:
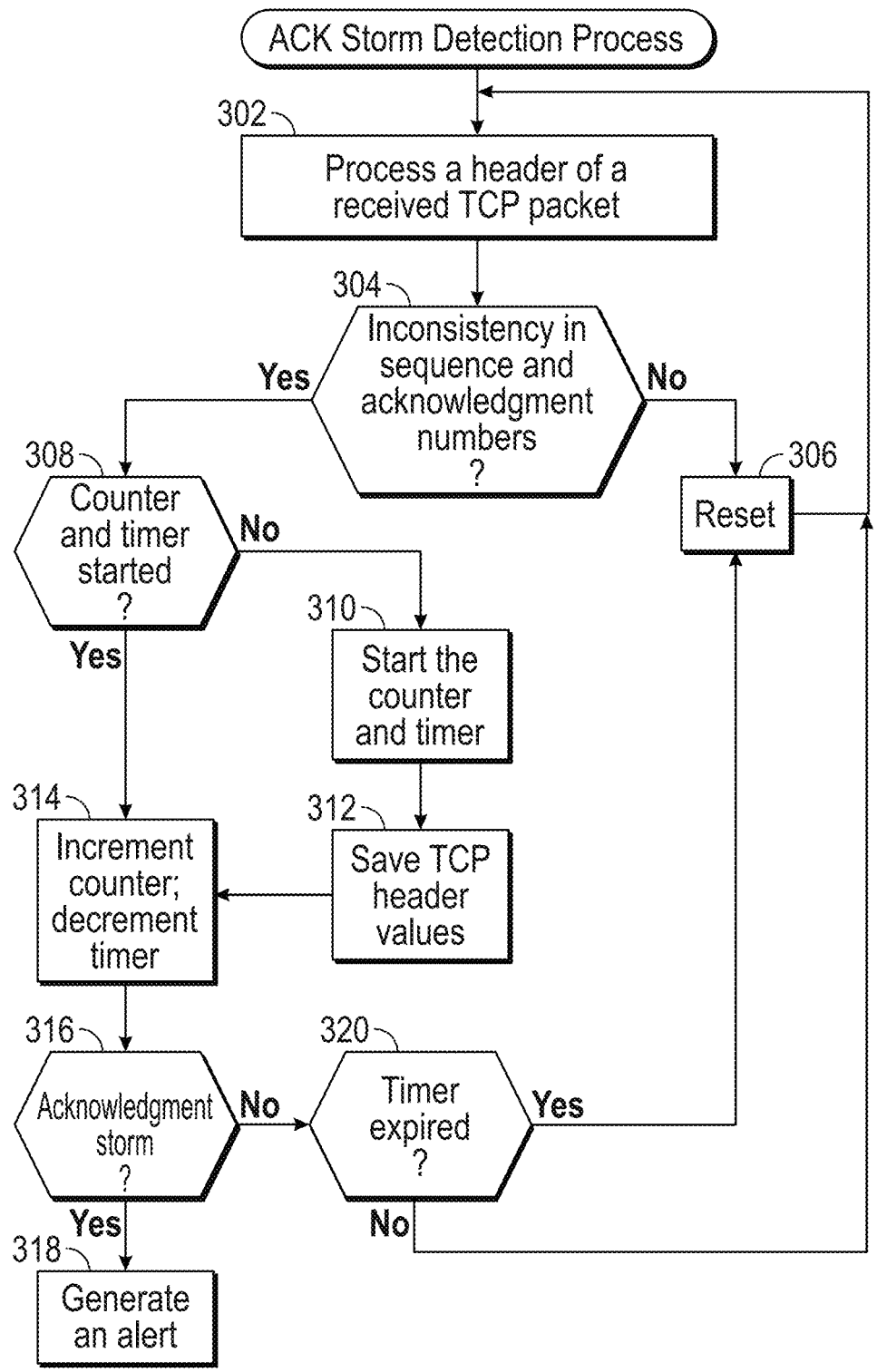
FIG. 3 is a flow diagram of an acknowledgement storm protection process, according to some examples.

FIG. 3 is an example flow diagram of a process that can be performed by an ACK storm detection logic, such as 130-2 (or 130-1) in FIG. 1. The ACK storm detection logic processes (at 302) a TCP header of a received TCP packet. The ACK storm detection logic determines (at 304) if there is an inconsistency in sequence and acknowledgment numbers. For example, the ACK storm detection logic can check whether the TH.SEQ number in a received packet (e.g., 204 in FIG. 2) is not equal to the RCV.NXT number in a sent packet (e.g., 202 in FIG. 2), or if the TH.ACK number in the received packet is not equal to the SND.NXT number in the sent packet. If inconsistent sequence and acknowledgment numbers are not detected, then the ACK storm detection logic resets (at 306) the ACK storm detection process, and a counter and timer (discussed further below) are reset. The ACK storm detection logic then continues to process the next received TCP packet.

If an inconsistency is detected in the sequence and acknowledgment numbers (at 304), the ACK storm detection logic determines (at 306) if the counter and timer are already running. The counter and timer may have been started based on a previous detection of inconsistent sequence and acknowledgment numbers. If the counter and timer have not yet started, the ACK storm detection logic starts (at 310) the timer and the counter. Also, the ACK storm detection logic saves (at 312) the TCP header values (including the sequence and acknowledgment numbers, window size, timestamp, etc.) of the received TCP packet in a storage medium (for later use).

If the counter and timer are already running, or after the timer and counter have started (at 310), the ACK storm detection logic updates (at 314) the counter and the timer, such as by incrementing the counter and decrementing the timer. The counter is incremented to reflect that a particular instance of inconsistent sequence and acknowledgment numbers (e.g., TH.SEQ≠RCV.NXT or TH.ACK<SND.UNA or TH.ACK>SND.NXT) has been detected. The timer is decremented to track a specified timeout duration.

Although the example refers to incrementing the counter and decrementing the timer, in other examples, the counter can be decremented and the timer incremented or decremented in response to each detection of inconsistent sequence and acknowledgment numbers.

Note that the count is of the number of instances of inconsistent sequence and acknowledgment numbers that match a desynchronization packet pattern. The desynchronization packet pattern includes a specific combination of TH.SEQ and RCV.N×T values (e.g., a combination of TH.SEQ=456789 and RCV.NXT=123456 in the FIG. 2 example). For this example, the counter is incremented in response to each occurrence of an instance of the desynchronization packet pattern where TH.SEQ=456789 and RCV.NXT=123456.

For other desynchronization packet patterns, the ACK storm detection logic can maintain other counter and timer values. In other words, the acknowledgment storm detection process of FIG. 3 is iterated for each respective desynchronization packet pattern. If multiple desynchronization packet patterns are detected, then multiple iterations of the acknowledgment storm detection process of FIG. 3 would be performed.

The ACK storm detection logic next determines (at 316) whether an acknowledgement storm is present. In some examples, an acknowledgement storm is indicated as present if the counter exceeds a specified count threshold, before the specified timeout duration has expired as tracked by the timer.

Note that the presence of the acknowledgement storm can further be based on other conditions, such as inconsistent window sizes, timestamps, SACK fields, and so forth. For example, the checkpointed data 122 for the TCP connection may indicate certain values of the window sizes, timestamps, and/or SACK fields. If sent or received packets have window sizes, timestamps, and/or SACK fields (as saved at 312) that are inconsistent with corresponding properties in the checkpointed data 122, then an acknowledgment storm can be declared.

If an acknowledgment storm is detected, the ACK storm detection logic generates (at 318) an alert, which can be sent to the I/O management engine 116-2 for forwarding to the server system 102. The connection fault management logic 126 in the server system 102 can receive this alert and can perform an appropriate countermeasure action, such as by resetting the TCP connection to restart the TCP connection. In further examples, in response to detecting an acknowledgment storm, the I/O management engine 116-2 can issue a socket close call to close the operation with a zero linger timeout to free resources held in the OS kernel 106-2 and to send a reset packet to the remote endpoint. Setting the zero linger timeout allows a TCP connection to be closed without having to wait for the TCP/IP stack to send pending data that has not yet been sent.

If an acknowledgement storm is not detected (at 316), which means that the counter has not yet counted to the specified count threshold, the ACK storm detection logic determines (at 320) whether the timer has expired. If so, that means that the counter has not reached the specified count threshold within the specified timeout duration tracked by the timer, which means an acknowledgment storm has not been detected. As a result, the acknowledgement storm detection process is reset, along with the counter and the timer (at 306). However, if the timer has not yet expired, then the ACK storm detection logic returns to task 302 to process a next received TCP packet, to continue the ACK storm detection process (the counter and timer are kept at their current values).

Figure 4:
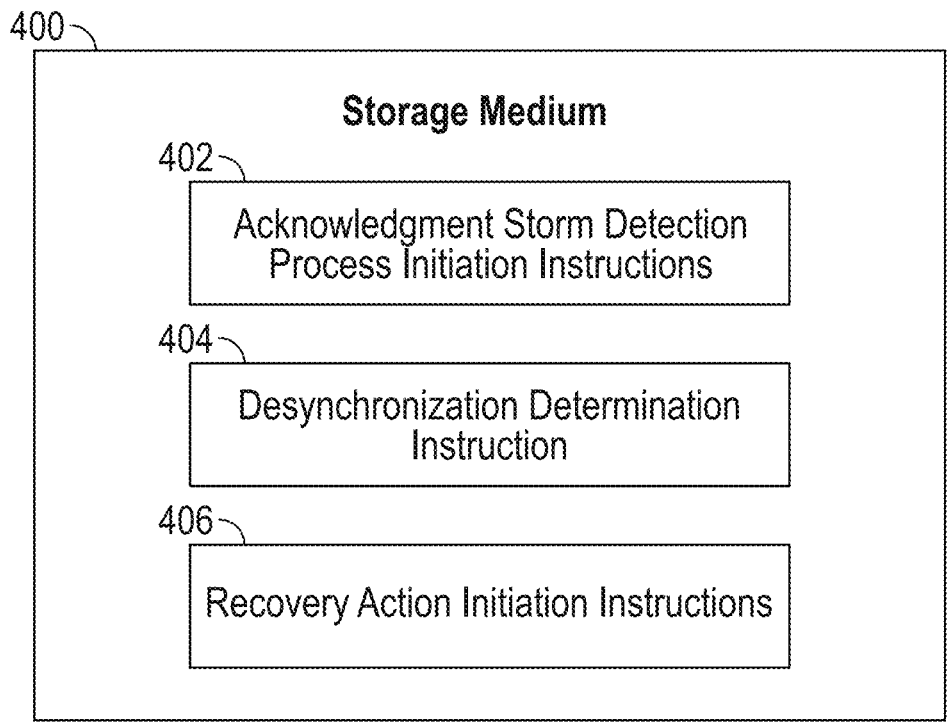
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a device to perform various tasks.

The machine-readable instructions include acknowledgement storm detection process initiation instructions 402 to initiate an acknowledgement storm detection process in response to failover of a network connection from a first I/O module to a second I/O module. The failover uses checkpointed data including information of the network connection to recreate the network connection at the second I/O module with a same state as the network connection at the first I/O module.

The initiation of the acknowledgement storm detection process can be performed by a failover module in a backup I/O module in response to a request provided by the connection fault management logic 126 upon detection of a fault in the network connection.

The machine-readable instructions also include desynchronization determination instructions 404 to determine whether desynchronization between a received packet and a sent packet satisfies a criterion. For example, the criterion is satisfied if the number of desynchronized received packets exceeds a count threshold in a specified timeout duration. More specifically, desynchronization between the received packet and the sent packet satisfies the criterion if a number of instances of a desynchronized packet pattern (i.e., a specific combination of inconsistent sequence and acknowledgment numbers) exceeds a count threshold.

The criterion can further be based on additional factors, including whether there are inconsistencies between other values of a TCP header of a packet and corresponding values stored in checkpointed data. Such other values can include a window size, a timestamp, and/or a SACK field value.

The machine-readable instructions further include recovery action initiation instructions 406 to, in response to determining that the desynchronization between the received packet and the sent packet satisfies the criterion, initiate an action to recover from the desynchronization. The action can include resetting the network connection, such as by resetting the network connection with a zero linger timeout.

Figure 5:
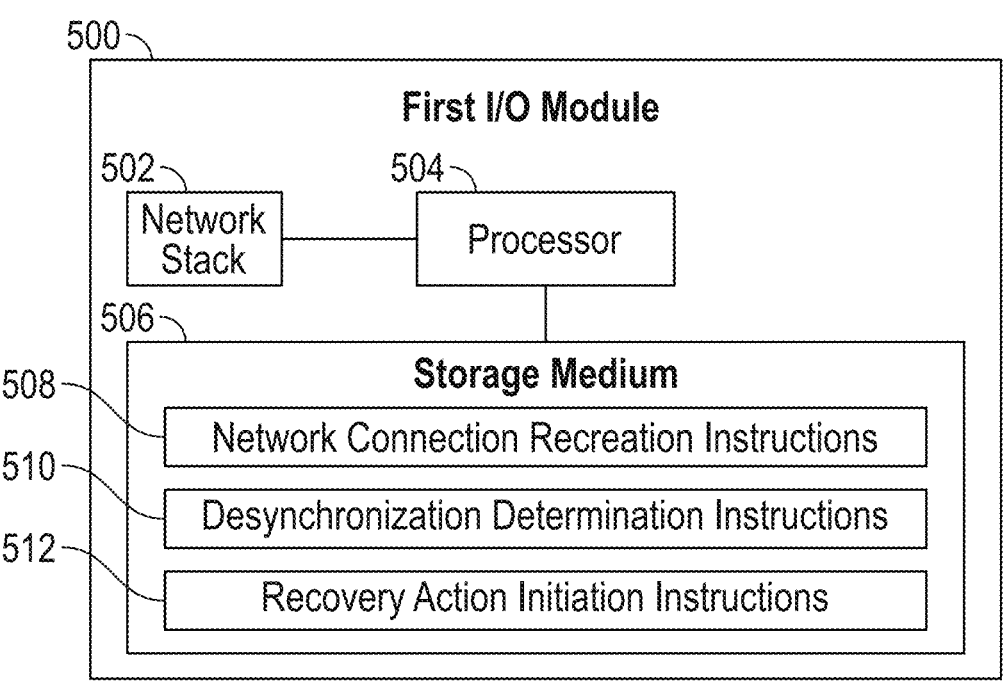
FIG. 5 is a block diagram of an I/O module according to some examples.

FIG. 5 is a block diagram of a first I/O module 500 according to some examples. The first I/O module 500 includes a network stack 502 to communicate packets over a network, and a hardware processor 504 (or multiple hardware processors). A hardware processor can include a microprocessor, a core of a multi-core microprocessor, a microcontroller, a programmable integrated circuit, a programmable gate array, a digital signal processor, or another hardware processing circuit.

The first I/O module 500 further includes a storage medium 506 that stores machine-readable instructions executable on the hardware processor 504 to perform various tasks. Machine-readable instructions executable on a hardware processor can refer to the instructions executable on a single hardware processor or the instructions executable on multiple hardware processors.

The machine-readable instructions in the storage medium 506 includes network connection recreation instructions 508 to recreate a network connection at the first I/O module 500 based on a state of the network connection at a second I/O module that has experienced a fault. The recreating of the network connection at the first I/O module is responsive to a failover request from a device coupled to the first and second I/O modules.

The machine-readable instructions further include desynchronization determination instructions 510 to determine whether desynchronization between a received packet and a sent packet communicated in the network connection satisfies a criterion. The desynchronization between the received packet and the sent packet satisfies the criterion if a number of received packets that are desynchronized with respect to the sent packet exceeds a count threshold within a specified time duration.

The machine-readable instructions further include recovery action initiation instructions 512 to, in response to determining that the desynchronization between the received packet and the sent packet satisfies the criterion, initiate an action to recover from the desynchronization.

Figure 6:
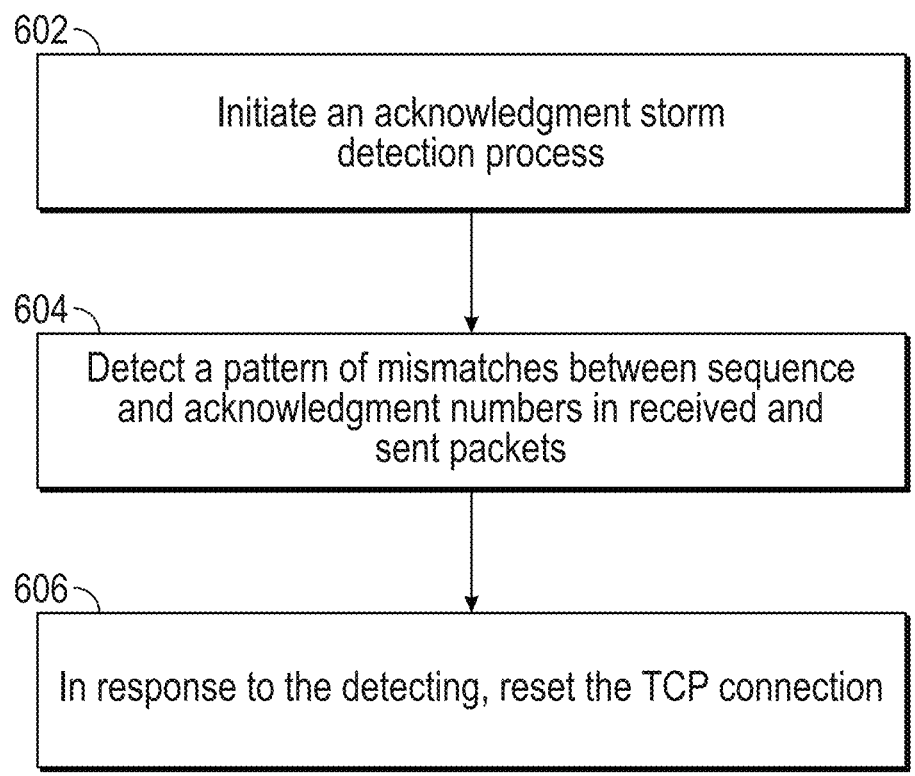
FIG. 6 is a flow diagram of a process according to further examples.

FIG. 6 is a flow diagram of a process according to some examples. The process initiates (at 602) an acknowledgement storm detection process in response to failover of a TCP connection from a first I/O module to a second I/O module.

The acknowledgement storm detection process includes detecting (at 604) a pattern of mismatches between sequence or acknowledgment numbers in received packets and sent packets, and in response to the detecting, resetting (at 606) the TCP connection.

The storage medium 400 (FIG. 4) or 506 (FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a device to: initiate an acknowledgement storm detection process in response to failover of a network connection from a first input/output (I/O) module to a second I/O module, wherein the acknowledgement storm detection process comprises: updating, for the network connection, a first counter responsive to detecting an occurrence of a first combination of a first sequence number and a first acknowledgment number that are inconsistent in received and sent packets, updating, for the network connection, a second counter responsive to detecting an occurrence of a second combination of a second sequence number and a second acknowledgment number that are inconsistent in the received and sent packets, wherein the second sequence number being inconsistent with the second acknowledgment number indicates that a remote endpoint has acknowledged a byte of data that not yet been sent by the device, and wherein the first combination is different from the second combination, determining whether desynchronization between the received and sent packets satisfies criteria based on the first counter and the second counter, and in response to determining that the desynchronization between the received and sent packets satisfies the criteria, initiate an action to recover the network connection from the desynchronization.

2. The non-transitory machine-readable storage medium of claim 1, wherein the desynchronization between the received and sent packets satisfies the criteria if either the first counter or the second counter has a count value that exceeds a count threshold.

3. The non-transitory machine-readable storage medium of claim 1, wherein the first sequence number is in a first received packet at the device, and the first acknowledgment number is in a first sent packet from the device, and wherein the second sequence number is in a second sent packet from the device, and the second acknowledgment number is in a second received packet at the device.

4. The non-transitory machine-readable storage medium of claim 1, wherein the desynchronization between the received and sent packets satisfying the criteria is indicative of presence of an acknowledgement storm, and wherein the acknowledgement storm detection process further detects the presence of the acknowledgment storm based on an inconsistency of a property in a header of a received packet or a sent packet, the property selected from among a window size, a timestamp, and a selective acknowledgment field.

5. The non-transitory machine-readable storage medium of claim 1, wherein the instructions are executable in the second I/O module to initiate the acknowledgment storm detection process.

6. The non-transitory machine-readable storage medium of claim 1, wherein the action comprises resetting the network connection.

7. The non-transitory machine-readable storage medium of claim 6, wherein resetting the network connection comprises resetting the network connection with a zero linger timeout.

8. The non-transitory machine-readable storage medium of claim 1, wherein the network connection comprises a Transmission Control Protocol (TCP) connection.

9. The non-transitory machine-readable storage medium of claim 1, wherein the failover uses checkpointed data comprising information of the network connection to recreate the network connection at the second I/O module with a same state as the network connection at the first I/O module.

10. A non-transitory machine-readable storage medium comprising instructions that upon execution cause a device to:
    initiate an acknowledgement storm detection process in response to failover of a network connection from a first input/output (I/O) module to a second I/O module, wherein the acknowledgement storm detection process comprises:

updating, for the network connection, a first counter responsive to detecting an occurrence of a first combination of a first sequence number and a first acknowledgment number that are inconsistent in received and sent packets, wherein the first sequence number is in a first received packet at the device, and the first acknowledgment number is in a first sent packet from the device, wherein the first acknowledgment number in the first sent packet from the device represents a next byte of data that is expected from a remote endpoint at the device, and the first sequence number being inconsistent with the first acknowledgment number comprises the first sequence number not matching the first acknowledgment number, updating, for the network connection, a second counter responsive to detecting an occurrence of a second combination of a second sequence number and a second acknowledgment number that are inconsistent in the received and sent packets, wherein the first combination is different from the second combination, wherein the second sequence number is in a second sent packet from the device, and the second acknowledgment number is in a second received packet at the device, wherein the second sequence number being inconsistent with the second acknowledgment number indicates that the remote endpoint has acknowledged a byte of data that not yet been sent by the device, determining whether desynchronization between the received and sent packets satisfies criteria based on the first counter and the second counter, and in response to determining that the desynchronization between the received and sent packets satisfies the criteria, initiate an action to recover the network connection from the desynchronization.

11. The non-transitory machine-readable storage medium of claim 10, wherein the first received packet is received at the device after the device sent the first sent packet, and
    wherein the second received packet is received at the device after the device sent the second sent packet.

12. A first input/output (I/O) module comprising: a network stack to communicate packets over a network; a hardware processor; and a non-transitory storage medium storing instructions executable on the hardware processor to: recreate a network connection at the first I/O module based on a state of the network connection at a second I/O module that has experienced a fault; retrieve checkpointed data for the network connection, the checkpointed data comprising a Transmission Control Protocol (TCP) window size; determine whether an acknowledgment storm is present based on determining that the TCP window size in the checkpointed data is inconsistent with a TCP window size in a header of a sent packet or a received packet and based on an acknowledgment storm detection process that comprises: updating, for the network connection, a first counter responsive to detecting an occurrence of a first combination of a first sequence number and a first acknowledgment number that are inconsistent in received and sent packets, updating, for the network connection, a second counter responsive to detecting an occurrence of a second combination of a second sequence number and a second acknowledgment number that are inconsistent in the received and sent packets, wherein the second sequence number being inconsistent with the second acknowledgment number indicates that a remote endpoint has acknowledged a byte of data that not yet been sent by a device, and wherein the first combination is different from the second combination, and determining whether desynchronization between the received and sent packets satisfies criteria based on the first counter and the second counter; and in response to determining that the acknowledgment storm is present, initiate an action to recover from the acknowledgment storm.

13. The first I/O module of claim 12, further comprising:
an operating system kernel, wherein the network stack and the instructions are part of the operating system kernel.

14. The first I/O module of claim 12, wherein the instructions are execrable on the hardware processor to detect that the acknowledgment storm is present further based on an inconsistency of a timestamp or a selective acknowledgment field in the header of the sent packet or the received packet.

15. The first I/O module of claim 12, wherein the recreating of the network connection at the first I/O module is responsive to a failover request from a device coupled to the first and second I/O modules.

16. A method performed by a device, comprising: initiating an acknowledgement storm detection process in response to failover of a Transmission Control Protocol (TCP) connection from a first I/O module to a second I/O module, wherein the acknowledgement storm detection process comprises: updating, for the TCP connection, a first counter responsive to detecting an occurrence of a first combination of a first sequence number and a first acknowledgment number that are inconsistent in received and sent packets, updating, for the TCP connection, a second counter responsive to detecting an occurrence of a second combination of a second sequence number and a second acknowledgment number that are inconsistent in the received and sent packets, wherein the second sequence number being inconsistent with the second acknowledgment number indicates that a remote endpoint has acknowledged a byte of data that not yet been sent by the device, and wherein the first combination is different from the second combination, determining whether desynchronization between the received and sent packets satisfies criteria based on the first counter and the second counter, and in response to determining that the desynchronization between the received and sent packets satisfies the criteria, reset the TCP connection.

17. The method of claim 16, wherein the acknowledgement storm detection process is performed by a module of an operating system kernel of the second I/O module.

18. The method of claim 16, wherein the first sequence number is in a first received packet at the device, and the first acknowledgment number is in a first sent packet from the device, and
wherein the second sequence number is in a second sent packet from the device, and the second acknowledgment number is in a second received packet at the device.

19. The method of claim 16, wherein updating the first counter comprises incrementing or decrementing the first counter, and wherein updating the second counter comprises incrementing or decrementing the second counter.

\* \* \* \* \*